United States Patent [19]

Margolin et al.

[11] Patent Number: 4,705,352

[45] Date of Patent: Nov. 10, 1987

[54] FIBER OPTIC CONNECTOR

[75] Inventors: Mark Margolin; Igor Grois, both of Lincolnwood, Ill.

[73] Assignee: Amphenol Corporation, Wallingford, Conn.

[21] Appl. No.: 818,576

[22] Filed: Dec. 30, 1985

[51] Int. Cl.⁴ .............................. G02B 6/36; G02B 7/26
[52] U.S. Cl. .................................. 350/96.20; 350/96.21
[58] Field of Search ............................ 350/96.20, 96.21

[56] References Cited

U.S. PATENT DOCUMENTS

| | | | |
|---|---|---|---|
| 4,198,119 | 4/1980 | Uberbacher | 350/96.20 |
| 4,447,121 | 5/1984 | Cooper et al. | 350/96.21 |
| 4,448,478 | 5/1984 | Matthews et al. | 350/96.21 |
| 4,461,539 | 7/1984 | Bailey et al. | 350/96.21 |
| 4,477,146 | 10/1984 | Bowen et al. | 350/96.20 |
| 4,479,910 | 10/1984 | Kurokawa et al. | 350/96.21 |
| 4,607,911 | 8/1986 | Rhodes | 350/96.21 |
| 4,615,581 | 10/1986 | Morimoto | 350/96.21 |
| 4,673,016 | 6/1987 | Margolin et al. | 157/1.24 |
| 4,684,205 | 8/1987 | Margolin et al. | 350/96.21 |

Primary Examiner—Robert E. Wise
Attorney, Agent, or Firm—Bacon & Thomas

[57] ABSTRACT

A fiber optic connector is provided for coupling a fiber optic cable. The connector includes a two part clamp body having a V groove therethrough defining a passage. The passage is of two different sizes to securely hold the fiber of a cable and the fiber covered with buffer layer of a cable therein. A metal tube extends out the back of the connector and serves as a base with a strength layer of the cable whereby an outer sleeve can be crimped onto the Kevlar to hold the Kevlar between the outer sleeve and the inner tube. The two part body is held together by a split sleeve at the front portion thereof and a coupling member serves to couple the connector to an adapter for connecting the connector to a light connector or other fiber optic device. A keying mechanism is provided to ensure that upon repeated couplings the fiber connector is always connected in the same relative rotation position to prevent scarring of the end of the fiber.

15 Claims, 3 Drawing Figures

FIBER OPTIC CONNECTOR

BACKGROUND OF THE INVENTION

This invention relates generally to fiber optic connectors, and more particularly, to a fiber optic connector for coupling a pair of fiber optic cables or a single fiber optic cable and a light source or detector in a separable in-line connector. More specifically, the invention relates to a fiber optic connector of the type which when assembled requires no epoxy to hold the fiber of a fiber optic cable and permits flush cleaving of the fiber with the termination end of the connector to avoid the requirement with most prior art connectors of polishing the end of the fiber.

It is generally known in the industry that a fiber optic cable generally includes an optical fiber surrounded by a coating or "jacket", with strength members extending longitudinally between the optical fiber and the outer coating or jacket. The strength members are typically made of fiber material sold by DuPont under the name Kevlar ®. An optical "fiber" conventionally includes a core surrounded by a cladding, both of which are of glass but with different indices of refraction. However, in the specification and claims herein the terms "core" or "fiber core" or "waveguide" will be used to denote this composite element of the fiber optic cable unless otherwise indicated. In addition to the above, surrounding the core or waveguide is a buffer layer typically made of silicone which is intermediate the strength member layer and the core of the cable.

The terminal end surface of an inner fiber core of a fiber optic cable for use in light wave transmission must be flat and highly polished to minimize insertion losses. In addition, the fiber must also be axially, laterally and angularly aligned within certain tolerances to establish good optical coupling between two cables, or a cable and a sensor or a light transmitter.

Typically, in the prior art, there have been developed many fiber optic connectors which are precision, expensive instruments providing very low insertion losses. These connectors are typically designed for certain applications such as long distance applications in telephonic systems and in other applications requiring extremely low insertion losses where expensive low loss connectors may be employed. On the other hand, expensive low loss connectors are not always well suited for applications which require a large number of connectors which, as a result of their high cost, makes the use of these connectors not economically feasible.

Examples of such applications not suited for expensive connectors are computers, cable television and other data tranmission applications, which require that a large number of fiber optic cables be employed. Thus, there is a need for low cost, low loss fiber optic connectors which minimize insertion losses due to off-centering of the fiber relative to the outer dimensions of the connector or terminal member. In the case of most prior art low cost fiber optic connectors, although cost is reduced, excessive insertion losses result due to, for example, the inner fiber core often being not concentric with the outer coating or cladding which leads to excessive insertion losses when a connector that utilizes the outer coating or cladding as a jigging surface is put into a data transmission line.

U.S. Pat. No. 4,515,434 having a common inventor with the inventor of this device, discloses an improved low cost fiber optic connector for optically coupling a pair of fiber optic cables, or a single fiber optic cable and a light source detector which avoids a number of the above-discussed disadvantages. More particularly, a terminal member is provided having a through-hole extending axially therethrough including a portion of the through hole sized to snugly receive a length of fiber. A clamping arrangement is provided in the back portion of the elements defining the through-hole for clamping the outer coating of the cable to prevent lengthwise movement of the fiber optic cable relative to the terminal member. In this manner, all the elements of the fiber optic cable are securely held and due to the precise molding of the connector, it is possible to precisely align the connector to another connector or sensor or light source.

On the other hand, the connector of U.S. Pat. No. 4,515,434 includes a number of disadvantages in that it is of different shape from standard connectors known as SMA connectors and thus, are not compatible. Further, the clamping member for the cable does not always ensure tight clamping and there is the possibility that, due to the multiple layers of the cable, some movement is still possible with respect to the cable and therefore, the fiber can be brought out of alignment or moved longitudinally within the connector itself.

A still further disadvantage is that the connector is made of two parts and to ensure non-longitudinal or transverse movement of one part with respect to the other, a relatively difficult to mold pin and hole arrangement is required to ensure that the two halves are retained together and further, there is reliance on an adapter to hold the halves together, which holding or securing of the halves together is not effected until the entire arrangement is coupled to a like connector or sensor or light source.

SUMMARY OF THE INVENTION

It is thus an object of the present invention to provide a low cost connector which is readily interchangeable and connectable to standard connectors in the prior art, but which is low cost and securely holds a fiber therein in proper alignment.

It is another object of the present invention to provide such a connector which includes a novel cable securing mechanism for securing the fiber optic cable to the connector at the rear end thereof, while at the same time firmly and securely holding the fiber within the connector in precise alignment at the termination end of the connector.

Still another object of the present invention is to provide such a connector which upon repeated connections and disconnections always ensures the same positioning of the fiber with respect to its rotational position about its longitudinal axis.

Yet still another object of the present invention is to provide such a fiber optic connector which is securely held together by a unique compressive mechanism so that precautionary steps need not be taken prior to establishing a connection with said connector.

In accordance with the invention there is provided a fiber optic connector for coupling a fiber optic cable. The cable is of the type having an outer coating about a strength layer which in turn surrounds a buffer layer surrounding a fiber waveguide. The connector comprises a terminal defined by a pair of matching halves, each having complimentary V-shaped grooves defining a through-hole extending axially therethrough when the halves are assembled together. The throughhole includes a first portion which extends between forward mating end portions of the matching halves and is sized to snugly receive a length of the fiber waveguide stripped of the buffer and strength layer and coating, and which properly positions the fiber with respect to the mating end of the terminal member.

The through-hole also includes a second portion extending between the mating end and the rear end of the matching halves, and which is sized to snugly receive a length of the waveguide surrounded only by the buffer layer. A third portion of the through-hole located at the rear end of the mating or matching halves is sized to receive a tube member therein with the tube member having a diameter sufficient to permit the buffer covered waveguide length pass therethrough.

The tube member includes engaging means for engaging both pairs of matching halves in a manner such that the halves are held immobile with respect to each other both in the longitudinal as well as in the transverse direction, and the tube member is of sufficient length to extend for a length out the rear of the matching halves.

An outer sleeve which is crimpable is provided which is of a size sufficient for being received over the rear of the matching halves and for being crimped onto the outside of the cable for holding the outer coating and strength layer of the cable between the crimp means and the length of the tube member extending out the rear of the matching halves. A resilient clamp means, preferably in the form of a split sleeve, is slideable over the forward mating end portion of the matching halves for clamping the matching halves together to hold the fiber therein. Coupling means serve to connect the fiber optic connector to a like connector or other element through a standard adapter for effecting the coupling of the fiber optic cable.

In more specific aspects, the matching halves are made of plastic material, preferably a polyester resin, and more preferably polyethylene terephthalate. With respect to the matching halves themselves, they are preferably of a shape such that when assembled together they are of a substantially circular cross-section throughout its length. The diameter of the body at the termination end is of a predetermined maximum diameter, at a middle section it is of a diameter larger than at the termination end, and at the rear end is of a diameter intermediate the diameter of the termination end and the middle section.

Other features of the invention will become more readily apparent upon a reading of the detailed discussion and claims, made with reference to the attached drawings.

DETAILED DISCUSSION OF THE INVENTION

Figure 1:
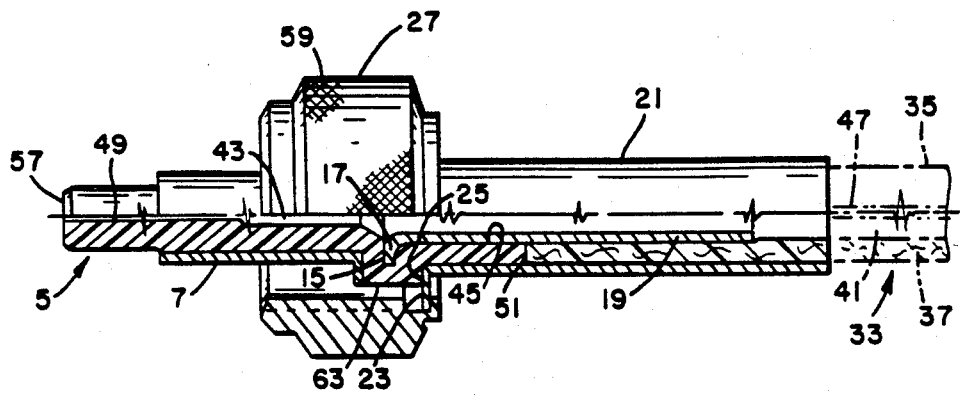
FIG. 1 is a side view, in partial cross-section, of the connector in accordance with the invention, showing various features thereof in assembled condition with a fiber optic cable.

Throughout the figures like elements will be designated with the like reference numbers. The invention is generally shown in partial cross-section in a side view and a perspective view, respectively, in assembled condition with a fiber optic cable 33, in FIGS. 1 and 2.

The cable 33 is of the type which includes an outer covering sheath 35, a layer of strength fibers 37, typically made of Kevlar ® as marketed by DuPont, a buffer layer 41, typically of a silicone type material, and the inner fiber or fibers 47, which fibers 47 can be a single fiber as in a single mode cable or a multitude of fibers clustered together as in a multimode cable. Hereinafter the fiber shall refer to both multimode as well as single mode fibers and generally refers to the waveguide within which light travels, which waveguide includes a core of a glass material through which the light travels surrounded by a cladding which is also of glass material, but is of slightly different refractive index than the core.

Figure 2:
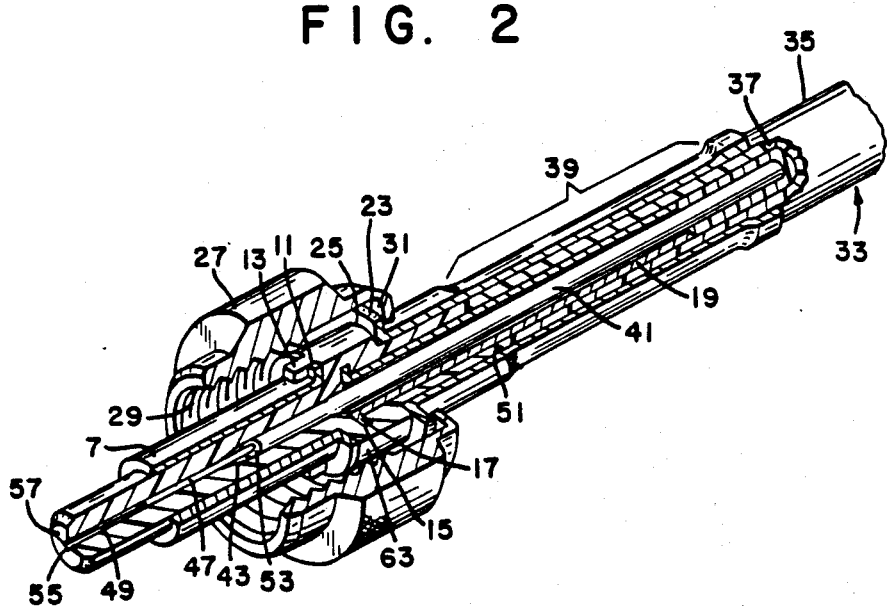
FIG. 2 is a perspective view in partial cut away showing the connector of FIG. 1 as assembled with a fiber optic cable.

As shown in FIGS. 1 and 2, the connector includes a two part clamping member 5 made up of preferably plastic and including a top part 1 and a bottom part 3. The plastic parts 1 and 3 respectively include a V-groove of progressively decreasing size toward the termination end of the clamping body 5, which V-groove has three portions, a smaller size portion 49 located proximate the termination end or surface 57 of the clamping body 5, an intermediate size V-groove portion 43 and a larger cylindrical portion 45, which when the parts 1 and 3 are assembled together to form the body 5, forms a varying diameter passage through the clamping body 5. The diameter of the smaller V-groove portion 49 is selected so as to snugly hold the fiber 47 of a fiber optic cable 33 therein when the body 5 is assembled together. The diameter of the intermediate passage 43 is selected so as to snugly hold the fiber 47 covered with the buffer layer 41. As can be seen from FIG. 2, the buffer layer terminates at portion 53 slightly before the reducing of the diameter of the passage and the fiber itself is cleaved flush to terminate at point 55 flush with the face 57 of the clamp body 5. Thus as can be seen from FIGS. 1 and 2, the fiber is held by clamping both directly on the fiber portion 47 as well as on the buffer portion 41.

In addition to the above-discussed elements, received within the clamping member 5 is a tube 19 which extends out the rear of the clamping member for at least a portion thereof. The tube 19 includes a flange 17 which is received within a corresponding slot 15 which is molded into the clamping member 5. Accordingly, the dimension of the passage portion 45 must be sufficiently large as to permit the tube 45 to pass therethrough and extend out the rear of the clamp body 5. The fiber covered with the buffer 41 extends through the tube and out the rear of the connector into the cable assembly 33.

Figure 3:
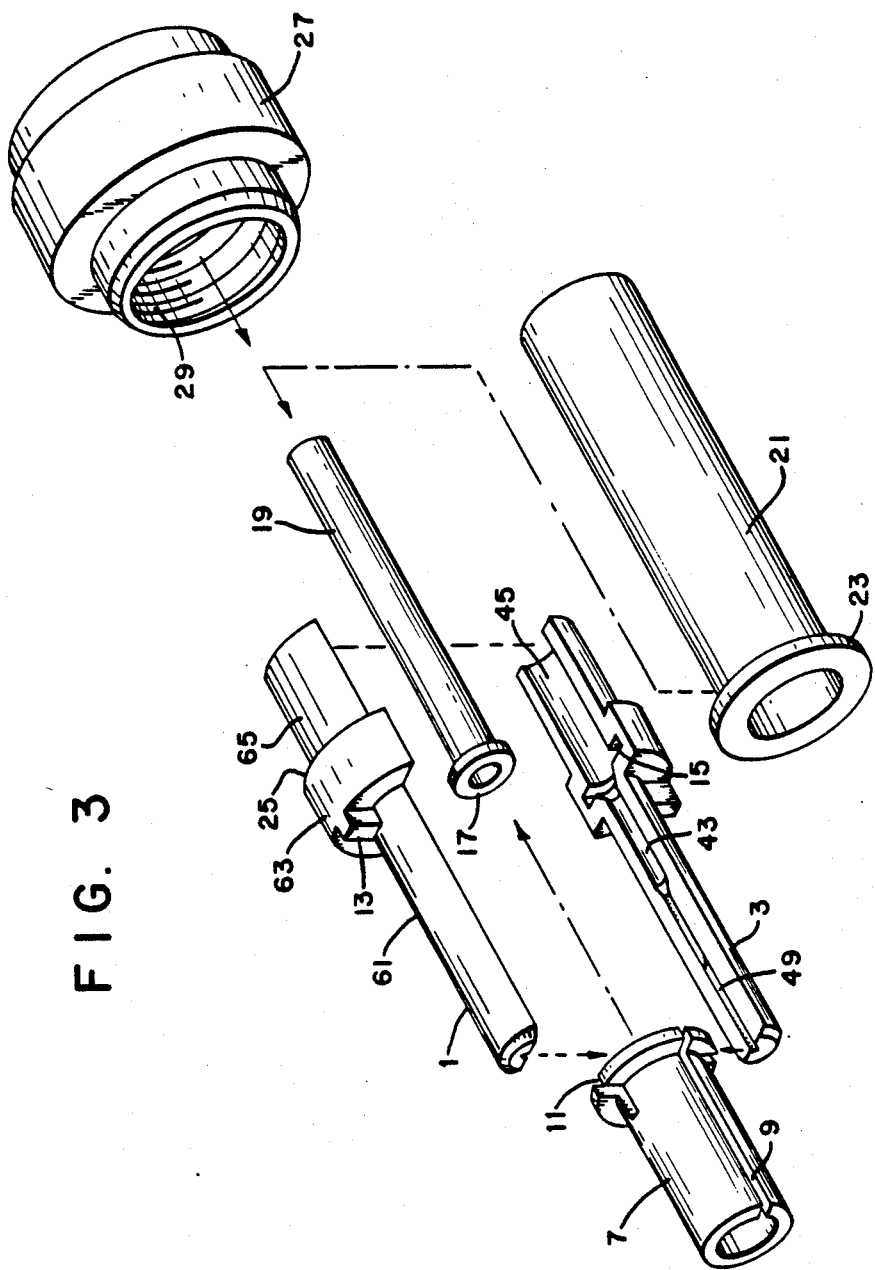
FIG. 3 is an exploded view of the connector in accordance with the invention showing the various elements thereof, and how they fit together, in the absence of a fiber optic cable.

As can be more clearly seen from FIG. 3, the clamp body parts 1 and 3 are held together as a clamp body 5 by means of a split sleeve 9 which is sized to be of a slightly smaller diameter than the front portions 61 of the clamp body 5. The split sleeve 7 includes a split portion 9 which allows it to compressively expand to fit over the front portion 61 of the clamp body 5 and hold the clamp body 5 together in clamping relationship with respect to the buffer 41 and the fiber 47 itself, of the fiber optic cable assembly 33 as held therein. As can be seen clearly from FIG. 1, the front portion 61 extends out the front of the sleeve 7 for a predetermined distance and as a result of the sleeve 7 being received over the front portion 61 of the clamp body 5, a more effective holding is achieved by means of direct pressure being exerted on both directly on the fiber 47 as well as directly on the buffer portion 41. The sleeve 7 includes a slot 11 to accommodate a keying mechanism 13 on the largest diameter portion 63 of the clamp body 5. The function of this key mechanism or projection 13, as shown in FIG. 3, will be explained in greater detail later.

When assembled, a crimp sleeve 21, including a projecting abutment flange 23, is received over the middle diameter portion 65 of the rear of the clamp body 5. The crimp sleeve 21 extends a distance coextensive with the projection of the tube 19 out the rear of the clamp body 5 and abuts at flange portion 23 against abutment 25 of larger diameter portion 63 of the clamp body 5. When employed in securing a fiber optic cable assembly 33 to the connector, the outer sheath 35 and strength layer or Kevlar ® fibers 37 of the fiber optic cable assembly 33 is received between the outer surface of the tube 19 and the inner surface of the crimp sleeve 21 with the outer surface of the tube 19 serving as a crimping support so that upon crimping of the sleeve 21, the sheath 35 Kevlar fibers 37 are securely held by the crimp sleeve 21 against the outer surface of tube 19. A coupling nut 27 is also then received over the exterior of the crimp sleeve 21 and includes threads 29 for threading and connecting the connector assembly to another connector or other assembly through an adapter constructed for engaging the threads 39. In this regard, it is noted that the coupling nut 27 includes a gnarled or rough outer surface 59 to permit or facilitate threading.

Turning now to the discussion of the projection 13 or keying mechanism, this keying mechanism is adapted to be received within a slot in a sleeve or tubular adapter for the connector to ensure that the fiber is always connected at the same relative rotational position to another fiber and thus, scarring of the end of the fiber is avoided. Examples of such an adapter are found in copending application Ser. Nos. 757,097 and 766,743 of Mark Margolin, et al.

With respect to the preferred materials for manufacturing the connector, it is noted that the two part body 5 is preferably made of a plastics material, typically Petra ®, as sold by Allied Corporation, which is a polyester resin, typically polyethylene terephthalate. The sleeve 7 is typically of steel or other metal which has a spring memory so as to compress the parts 1 and 3 together upon expansion as a result of it being received over the smaller diameter portion 61 of the body 5. The crimp sleeve 21 is typically made of metal such as steel or brass which does not have a spring memory and therefore retains its deformed shape when crimped. The tube 19 should be typically of a metal which is not easily deformable, again steel or brass, depending on how it is tempered. Finally, the coupling nut would typically be manufactured of a metal, also steel or brass. The selection of the materials, and their corresponding function as described above, is readily apparent and well known to those of ordinary skill in the art and need not be explained further herein.

What is claimed:

1. A fiber optic connector for coupling a fiber optic cable, said caable having an outer coating about a strength layer which in turn surrounds a buffer layer surrounding a fiber waveguide, and said connector comprising:
  (a) a clamp member terminal defined by a pair of matching halves having complementary V-shaped groove means defining a through-hole extending axially therethrough, said through-hole having a first portion extending between forward mating end portions of said matching halves and sized to snugly receive a length of said fiber waveguide stripped of said buffer and strength layer and said coating, and positioning said fiber waveguide with respect to the mating end of the terminal member at a position to transmit light to a like fiber terminated in a mating connector when connected thereto, said through-hole having a second portion extending between the mating end and the rear end of the matching halves and sized to snugly receive a length of said waveguide surrounded only by said buffer layer and said through-hole having a third portion located at the rear end of the matching halves and sized to receive a tube member therein;
  (b) a tube member having a diameter sufficient to permit said buffer covered waveguide length to pass therethrough, having engaging means for engaging both said pair of matching halves immobile with respect to each other both in the longitudinal as well as the transverse direction, and said tube member being of sufficient length to extend for a length out the rear of said matching halves;
  (c) outer sleeve crimp means of a size sufficient for being received over the rear of said matching halves and for being crimped onto the outside of said cable for holding the outer coating and strength layer of said cable between said crimp means and said length of tube member extending out the rear of said matching halves;
  (d) resilient clamp means slidable over the forward mating end portion of said matching halves for clamping said matching halves together to hold a fiber therein; and
  (e) coupling means for connecting said fiber optic connector to effect said coupling of said fiber optic cable.

2. A fiber optic connector as in claim 1 wherein said matching halves are made of plastic material.

3. A fiber optic connector as in claim 2 wherein said plastic material is a polyester resin.

4. A fiber optic connector as in claim 3 wherein said polyester resin is polyethylene terephthalate.

5. A fiber optic connector as in claim 1 wherein said matching halves, when assembled, define a body having a substantially circular cross-section throughout its length.

6. A fiber optic connector as in claim 5 wherein the diameter of said body at the termination end is of a predetermined maximum diameter, at the middle section is of a diameter larger than at the termination end, and at the rear end is of a diameter intermediate the diameter of the termination end and the middle section.

7. A fiber optic connector as in claim 6 wherein said resilient clamp means comprises a flexible split sleeve which in a relaxed condition has a diameter slightly smaller than that of said termination end of said body, and which is received over said termination end in abutment with said middle section to thereby hold said fiber of said fiber optic cable securely within said body.

8. A fiber optic connector as in claim 7 further comprising key means extending from said termination end for ensuring that said connector is always connected upon repeated connections and disconnections at the same rotational position with respect to its longitundinal axis.

9. A connector as in claim 7 wherein said split sleeve is made of a metal having a spring memory upon deformation thereof.

10. A fiber optic connector as in claim 6 wherein said outer sleeve crimp means comprises a second tube member received over said rear portion of said body for a length at least as great as the length said tube member extends, and said second member abutting against middle section of said body and crimped onto said cable to hold the outer sheath and strength layer between it and said tube member when said connector is in assembled condition.

11. A fiber optic connector as in claim 10 wherein said coupling means is an internally threaded coupling nut which is slideably received over said second tube member to abut against said middle section.

12. A connector as in claim 10 wherein said tube member is made of metal having no spring memory whereby when crimped it retains its crimped shape.

13. A connector as in claim 12 wherein said metal is brass.

14. A connector as in claim 11 wherein said coupling nut is made of brass.

15. A connector as in claim 1 wherein said metal is steel.

* * * * *